(12) United States Patent
McGinn et al.

(10) Patent No.: US 12,156,496 B2
(45) Date of Patent: Dec. 3, 2024

(54) STUMP REMOVER

(71) Applicant: Anaheim Precision Manufacturing, Orange, CA (US)

(72) Inventors: Matthew T. McGinn, Orange, CA (US); Joseph A. Puccio, Orange, CA (US); Kevin Koller, Ramona, CA (US)

(73) Assignee: Anaheim Precision Manufacturing, Orange, CA (US)

( * ) Notice: Subject to any disclaimer, the term of this patent is extended or adjusted under 35 U.S.C. 154(b) by 648 days.

(21) Appl. No.: 17/318,816

(22) Filed: May 12, 2021

(65) Prior Publication Data
US 2021/0352859 A1    Nov. 18, 2021

Related U.S. Application Data

(60) Provisional application No. 63/023,613, filed on May 12, 2020.

(51) Int. Cl.
*A01G 23/06*    (2006.01)

(52) U.S. Cl.
CPC .................................. *A01G 23/065* (2013.01)

(58) Field of Classification Search
CPC .... A01G 23/06; A01G 23/062; A01G 23/065; A01G 23/067

USPC ....................................................... 144/24.12
See application file for complete search history.

(56) References Cited

U.S. PATENT DOCUMENTS

| | | | | | |
|---|---|---|---|---|---|
| 1,504,963 | A | * | 8/1924 | McKoy | A01G 23/06 |
| | | | | | 144/219 |
| 2,025,340 | A | * | 12/1935 | Crocker | A01G 23/065 |
| | | | | | 414/626 |
| 2,825,370 | A | * | 3/1958 | Fieber | A01G 23/06 |
| | | | | | 144/69 |
| 3,845,797 | A | * | 11/1974 | Bartlett | A01G 23/06 |
| | | | | | 144/34.5 |
| 4,481,989 | A | * | 11/1984 | Peters | A01G 23/065 |
| | | | | | 144/34.5 |
| 10,159,200 | B2 | * | 12/2018 | Janhunen | A01G 23/065 |
| 2007/0033839 | A1 | * | 2/2007 | Jarvinen | A01G 23/065 |
| | | | | | 37/302 |

FOREIGN PATENT DOCUMENTS

CN    206078367    * 12/2017

* cited by examiner

*Primary Examiner* — Matthew Katcoff
(74) *Attorney, Agent, or Firm* — Michael Best & Friedrich LLP (57) ABSTRACT

A stump removal tool operable to sever a tree stump. The stump removal tool including an anchor fixedly couplable to the stump, and a cutting assembly adjustable between a closed position and an open position, and where the cutting assembly is removably couplable to the anchor.

20 Claims, 9 Drawing Sheets

STUMP REMOVER

CROSS-REFERENCE TO RELATED APPLICATIONS

This application claims the benefit of and priority to U.S. Provisional Patent Application No. 63/023,613, filed May 12, 2020. The entire contents of which are fully incorporated by reference herein.

FIELD OF THE DISCLOSURE

The present disclosure relates to outdoor tools, and more specifically to a portable tree stump remover.

BACKGROUND OF THE DISCLOSURE

Prior portable tree stump removers that cut, grind, or mill away a stump are typically complicated, large and cumbersome, heavy, and expensive. Wheels are frequently employed to transport the stump remover to a tree stump and to support the stump remover during the cutting process. Many of these removers must be towed to and from a job site.

SUMMARY OF THE DISCLOSURE

In one aspect, a stump removal tool operable to sever a tree stump. The stump removal tool includes an anchor configured to be fixedly secured to the tree stump, and a lead screw extending along a central axis of the stump removal tool and configured to selectively couple to the anchor. The stump removal tool also includes a plurality of arm assemblies coupled to the lead screw, each arm assembly including a blade plate. The lead screw is rotatable to adjust the stump removal tool between an open configuration in which each blade plate is located distant from the central axis, and a closed configuration in which each blade plate is located proximate the central axis.

In another aspect, a stump removal tool operable to sever a tree stump. The stump removal tool includes a lead screw extending along a central axis of the stump removal tool and configured to be coupled to the tree stump. The stump removal tool also includes a first central hub threadably engaged with the lead screw, and a second central hub rotatably coupled to a distal end of the lead screw. The stump removal tool further includes a plurality of arm assemblies pivotably coupled to each of the first central hub and the second central hub, each arm assembly including a blade plate. The lead screw is rotatable to adjust the stump removal tool between an open configuration in which the first central hub is located distant from the second central hub and each blade plate is located distant from the central axis, and a closed configuration in which the first central hub is located proximate the second central hub and each blade plate is located proximate the central axis.

In another aspect, a stump removal tool operable to sever a tree stump. The stump removal tool including an anchor configured to be fixedly secured to the tree stump, a cutting assembly defining a central axis therethrough, where the cutting assembly is removably couplable to the anchor, and where the cutting assembly includes a plurality of arm assemblies each including a blade plate, and where the plurality of arm assemblies are adjustable between an open configuration in which each blade plate is located a first distance from the central axis, and a closed configuration in which each blade plate is located a second distance from the central axis less than the first distance.

In another aspect, a stump removal tool operable to sever a tree stump. The stump removal tool including a lead screw extending along a central axis of the stump removal tool and configured to be coupled to the tree stump, a first central hub coupled to and configured to move axially along the lead screw, a second central hub coupled to and axially fixed relative to the lead screw, where the first central hub and the second central hub define a hub distance therebetween, a plurality of arm assemblies pivotably coupled to each of the first central hub and the second central hub, where each arm assembly including a blade plate, and where each blade plate defines a blade plate distance from the central axis, and where adjusting the hub distance causes at least one blade plate distance to change.

In another aspect, a stump removal tool operable to sever a tree stump. The stump removal tool including an anchor fixedly couplable to the stump, and a cutting assembly adjustable between a closed position and an open position, and where the cutting assembly is removably couplable to the anchor.

Other features and aspects of the disclosure will become apparent by consideration of the following detailed description and accompanying drawings.

Before any embodiments of the disclosure are explained in detail, it is to be understood that the disclosure is not limited in its application to the details of construction and the arrangement of components set forth in the following description or illustrated in the following drawings. The disclosure is capable of other embodiments and of being practiced or of being carried out in various ways. Also, it is to be understood that the phraseology and terminology used herein is for the purpose of description and should not be regarded as limiting.

DETAILED DESCRIPTION

Figure 1:
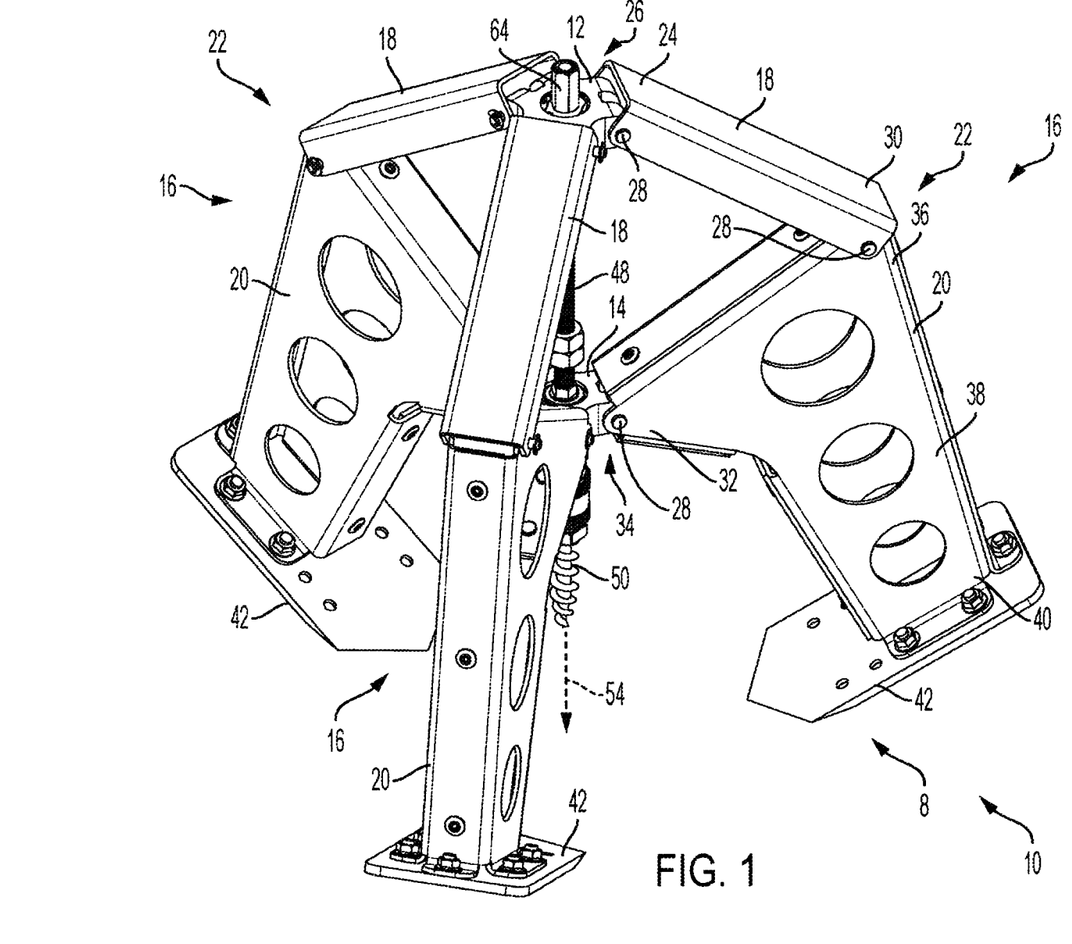
FIGS. 1 and 2 are perspective views of a stump removal tool, such as a stump jack, according to one embodiment, with the stump jack set to an open configuration.
Figure 2:
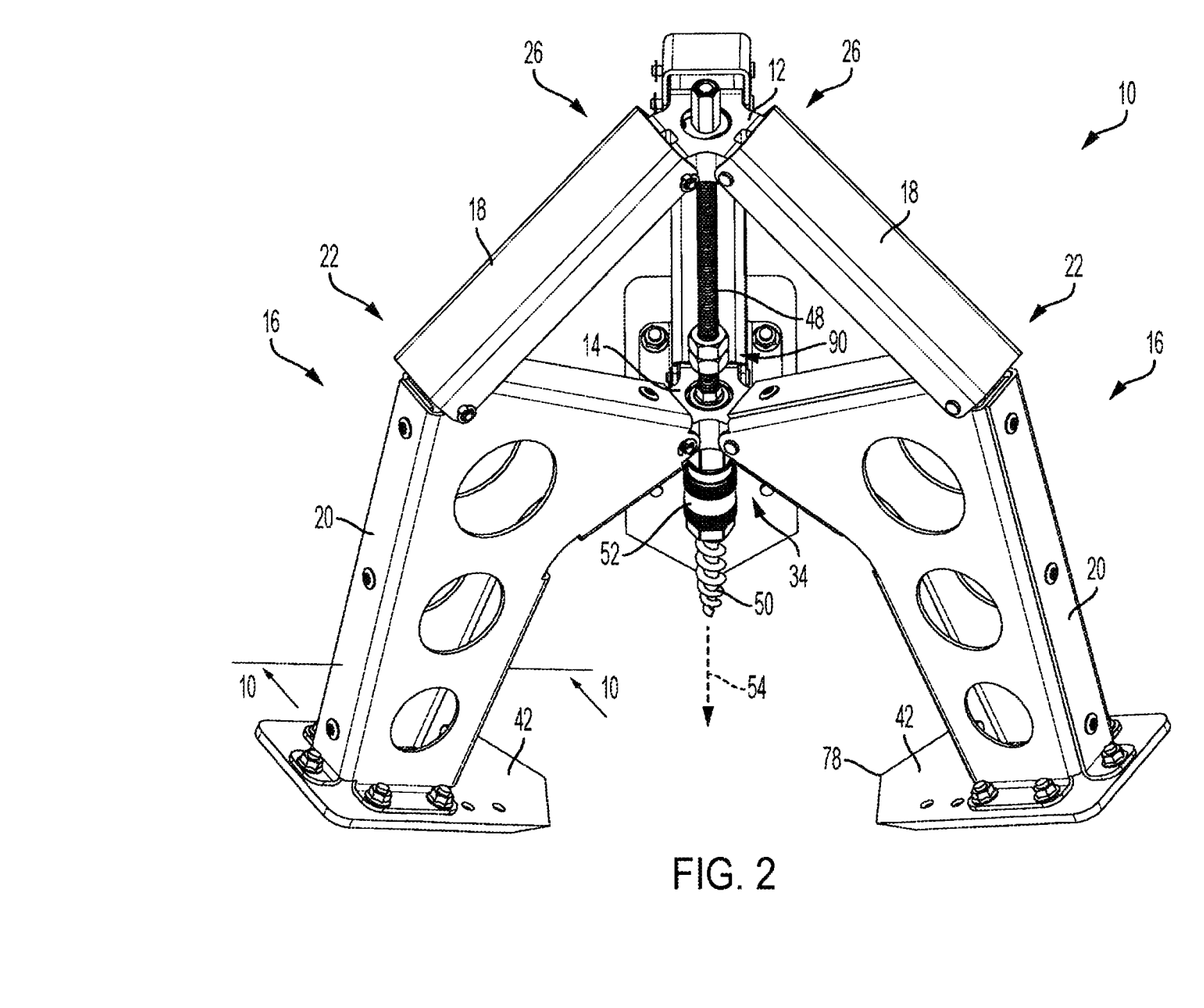

FIGS. 1 and 2 illustrate an outdoor tool in the form of a stump removal tool or stump jack 10. The stump jack 10 is operable to remove a stump S that typically remains in the ground after the trunk of a tree, bush, or similar plant has been severed at a location just above the surface of the ground. Specifically, the stump jack 10 is operable to be anchored to the remaining stump S and then sever the stump at a location below the surface of the ground, as will be described below. The stump jack 10 includes an anchor 50 configured to be fixedly coupled to the stump to be severed, and a cutting assembly 8, couplable to the anchor 50 and adjustable between an open configuration (see FIG. 1) and a closed configuration (see FIG. 3) to physically cut the stump S itself. By anchoring the cutting assembly 8 to the stump S via the anchor 50, the forces generated by and within the stump jack 10 during the cutting process are completely self-contained and/or directed into the stump. As such, no external supports, weights, or ballasts are required (e.g., a heavy truck, etc.).

Figure 8:
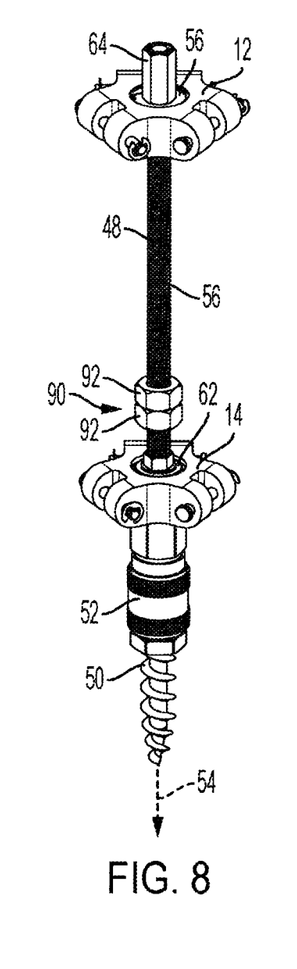
FIG. 8 is a perspective view of a lead screw and an anchor of the stump jack of FIG. 1.
Figure 9:
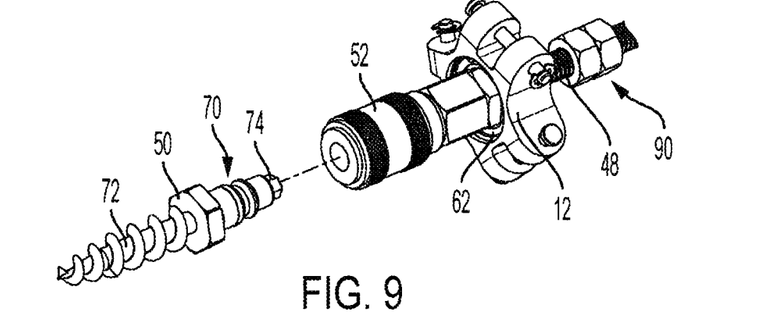
FIG. 9 is a partially exploded perspective view of a quick-release coupler and the anchor of the stump jack of FIG. 1.
Figure 10:
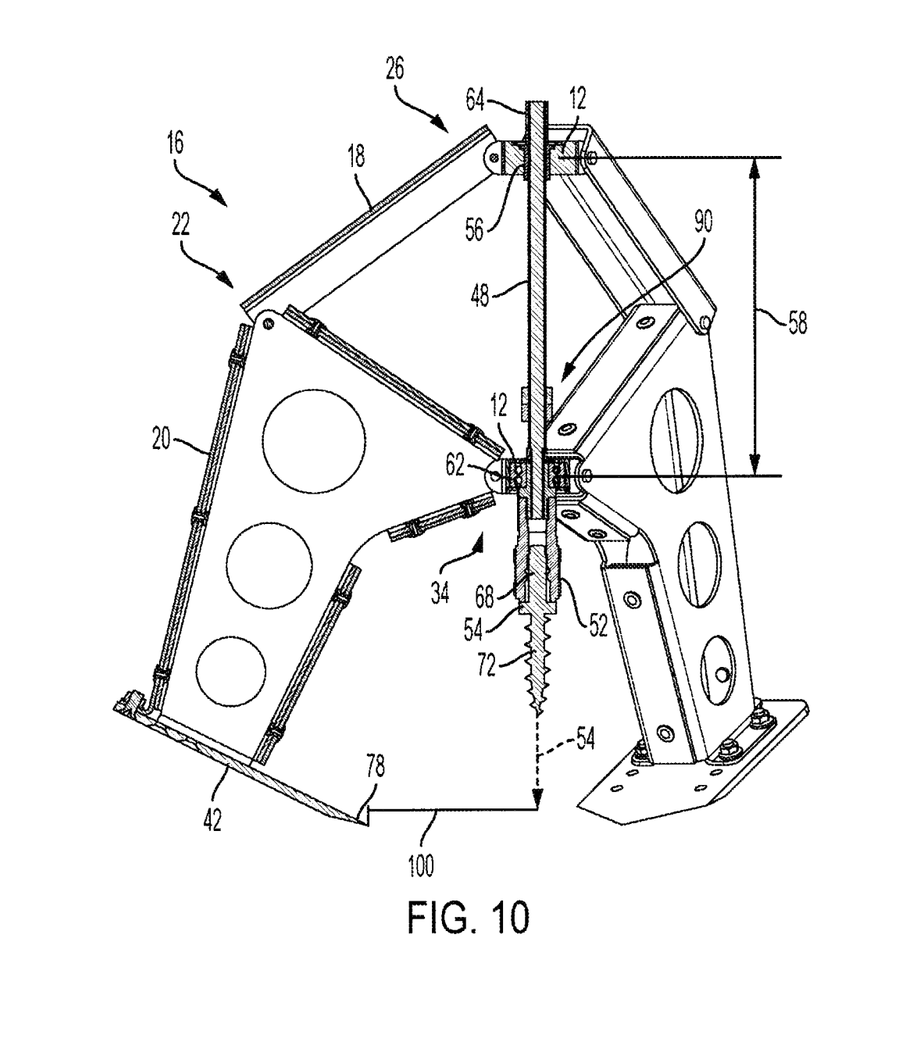
FIG. 10 is a cross-sectional view of the stump jack of FIG. 1, taken along line 10-10 of FIG. 2.

With reference to FIGS. 8-10, the anchor 50 of the stump jack 10 is configured to be releasably and fixedly coupled to the end surface of the stump S (e.g., the cut surface) to act as an anchor point for the stump jack 10. More specifically, the anchor 50 includes a screw portion 72 with wood screw threads configured to enter into and become lodged in the wood of the stump—resisting axial removal therefrom. The anchor 50 also includes a hexagonal head 74 configured to engage a tool (e.g., a wrench, a drill, etc.) to facilitate screwing the anchor 50 into and out of the stump. While a "screw" style anchor 50 is shown, it is understood that alternative forms of connection (e.g., adhesive, nails, grasping elements, and the like) may also be used.

The anchor 50 also includes a coupler portion 68 extending therefrom and configured to be releasably coupled to the cutting assembly 8. More specifically, the coupler 68 includes a male coupler configured to engage a female coupler 52 (described below) of the cutting assembly 8. In the illustrated embodiment, the male coupler 68 is shaped similar to a male pneumatic connection tip.

The cutting assembly 8 of the stump jack 10 includes a lead screw 48 defining a central axis 54, a first central hub 12 coupled to the lead screw 48, and a second central hub 14 coupled to the lead screw 48 to define a hub distance 58 between itself and the first central hub 12 (see FIG. 9). The cutting assembly 8 also includes a plurality of arm assemblies or jaws 16 each pivotably coupled to both of the first and second central hubs 12, 14, and a plurality of blade plates 42 coupled to a respective one of the plurality of arm assemblies 16 to move together therewith. During use, the movement of the first and second hubs 12, 14 relative to one another (e.g., changes in the hub distance 58) cause the arm assemblies 16 to move between the open configuration (see FIG. 1), in which the blade plates 42 are spaced a first radial distance from the central axis 54, and the closed configuration (see FIG. 3), in which the blade plates 42 are spaced a second radial distance from the central axis 54 that is less than the first radial distance. Generally speaking, moving the arm assemblies 16 from the open position to the closed position produces the stump cutting action (described below).

Figure 6:
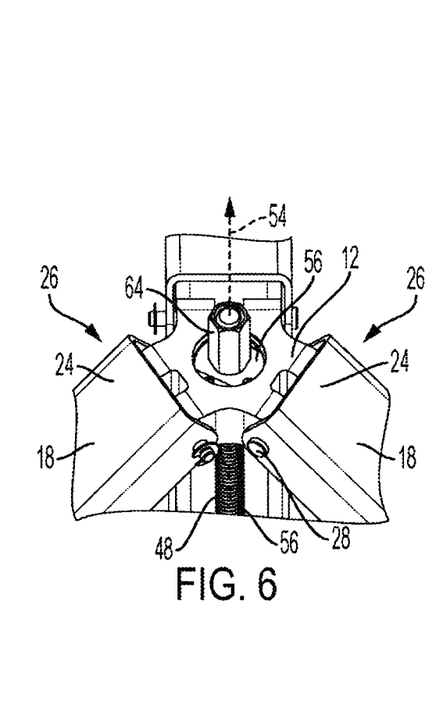
FIG. 6 is a perspective view of a first central hub of the stump jack of FIG. 1.
Figure 7:
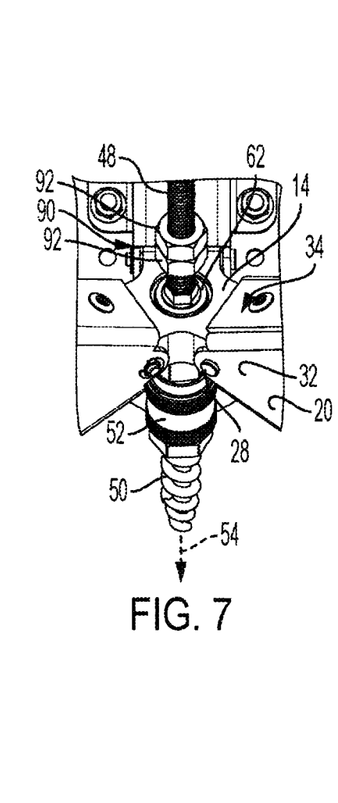
FIG. 7 is a perspective view of a second central hub of the stump jack of FIG. 1.

With reference to FIGS. 6-8, the lead screw 48 of the cutting assembly 8 is an elongated threaded rod having a proximal or first end 66 and a distal or second end 60 opposite the proximal end 66. In the illustrated embodiment the lead screw 48 is at least partially threaded. More specifically, the lead screw 48 includes ACME threads 56 along at least a portion of the axial length thereof configured to threadably engage with corresponding threads of the central hub 12. As such, rotation of the lead screw 48 about the central axis 54 causes the first central hub 12 to move axially along the length of the lead screw 48. While the illustrated first central hub 12 includes a nut captured within the body of the central hub 12, it is understood that in alternative embodiments the corresponding threads may be formed integrally into the body of the hub 12.

The distal end 60 of the lead screw 48 is supported by a bearing 62 that is fixedly retained within the second central hub 14 (see FIG. 9). The bearing 62 permits the lead screw 48 to rotate relative to the second central hub 14 but does not permit the second central hub 14 to translate axially along the length of the lead screw 48 (e.g., the second central hub 14 is axially fixed relative to the lead screw 48). Accordingly, when the lead screw 48 is rotated, the first central hub 12 travels along the length of the lead screw 48 (as described above) while the second central hub 14 remains fixed relative to the lead screw 48. As such, rotating the lead screw 48 causes the first and second central hubs 12, 14 to move toward or away from each other (e.g., causing the hub distance 58 to decrease and increase, respectively).

The proximal end 66 of the lead screw 48 further includes a hexagonal head 64. The hexagonal head 64 is configured to engage a tool, such as a hand tool (e.g., a wrench, a socket, etc.) or a power tool (e.g., a drill and socket, pneumatic driver, etc.), whereby the lead screw 48 can be rotated about the central axis 54 to operate the stump jack 10. For example, the stump jack 10 can be conveniently operated with a cordless drill (e.g., a drill driver, an impact driver, etc.) by engaging the hexagonal head 64 with a socket coupled to the drill, and rapidly turning the lead screw 48.

With reference to FIGS. 8-10, the lead screw 48 also includes a quick-release coupler 52 affixed to the distal end 60 thereof and configured to quickly engage or release from the anchor 50. In the illustrated embodiment, the quick-release coupler 52 comprises a female coupler of the type similar to those traditionally employed in pneumatic hose connections (i.e., having a detent member movable between radially inward and radially outward positions), and configured to compliment the male coupler portion 68 of the anchor 50 (described above). The resulting connection between the coupler 52 of the lead screw 48 and the coupler portion 68 of the anchor 50 is configured to permit the lead screw 48 to rotate relative to the anchor 50 but restrict relative axial movement therebetween. As such, the connection permits the user to rotate the lead screw 48 without transmitting rotational forces to the anchor 50 while still allowing axial forces to be transmitted into the stump S itself.

While the illustrated embodiment includes a male connection associated with the anchor 50 and a female connector associated with the lead screw 48, it is understood that in alternative embodiments the components can be reversed.

Figure 4:
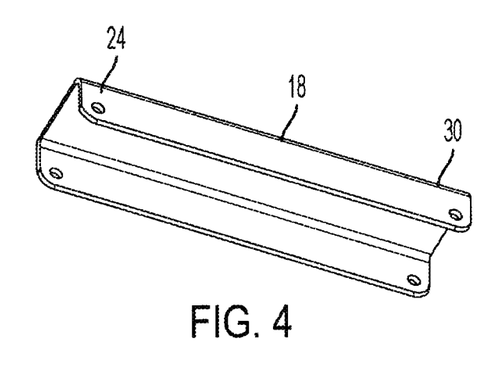
FIG. 4 is a perspective view of an upper arm of the stump jack of FIG. 1.

With reference to FIGS. 1 and 2, each arm assembly 16 includes an elongated upper bracket or upper arm 18, and a generally L-shaped lower bracket or lower arm 20 pivotably coupled to the upper arm 18 at a heel joint 22. The upper arm 18 includes a first end 24 hingedly connected to the first central hub 12 at an upper joint 26 (e.g., via a clevis pin 28), and a second end 30 spaced apart from the first end 24 and hingedly connected to the L-shaped lower arm 20 at the heel joint 22 (e.g., via a clevis pin 28). With reference to FIG. 4, in the illustrated embodiment, each upper arm 18 comprises a U-channel formed from a folded piece of sheet material (e.g., steel). However, in alternative embodiments the upper arm 18 may be cast, formed from structural steel, and the like.

Figure 5:
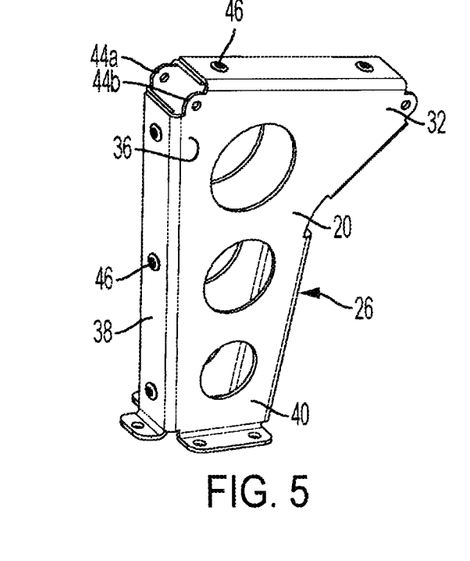
FIG. 5 is a perspective view of a lower arm of the stump jack of FIG. 1.

Referring again to FIGS. 1 and 2, the lower arm 20 is substantially "L" shaped and includes a toe portion 32 hingedly connected to the second central hub 14 at a toe joint 34 (e.g., via a clevis pin 28), a heel portion 36 spaced apart from the toe portion 32 and hingedly connected to the upper arm 18 at the heel joint 22, and a leg portion 38 that extends generally away from the toe and heel portions 32, 36 to form a distal end or foot portion 40. The distal end 40, in turn, supports the blade plate 42 (described below). With reference to FIG. 5, in the illustrated embodiment, each lower arm 20 comprises two separate folded members 44*a*, 44*b* (e.g., stamped steel) affixed to one another (e.g., via rivets 46). However, in alternative embodiments the each lower arm 20 may be formed as a single unit, cast, forged, and the like.

In the illustrated embodiment, the arm assemblies 16 of the cutting assembly 8 are angularly spaced from one another at equal intervals about the central hubs 12, 14 (e.g., relative to the central axis 54). However, while the illustrated embodiment includes three arm assemblies 16 each spaced at equal intervals apart, it is understood that in alternative embodiments more or fewer arm assemblies 16 may be present. In still other embodiments, the arm assemblies 16 may be spaced an uneven intervals.

Figure 11:
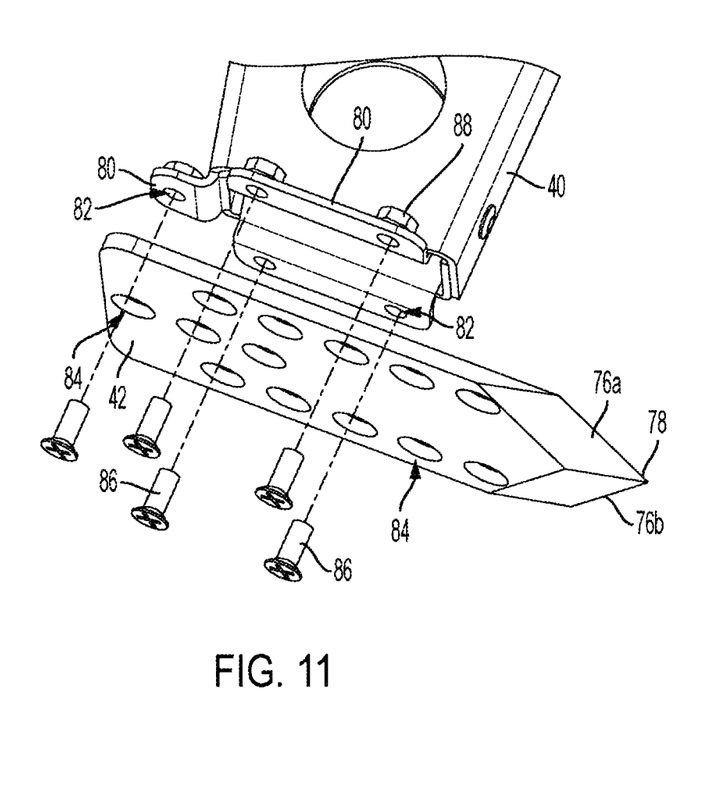
FIG. 11 is a partially exploded perspective view of a portion of the stump jack of FIG. 1.
Figure 12A:
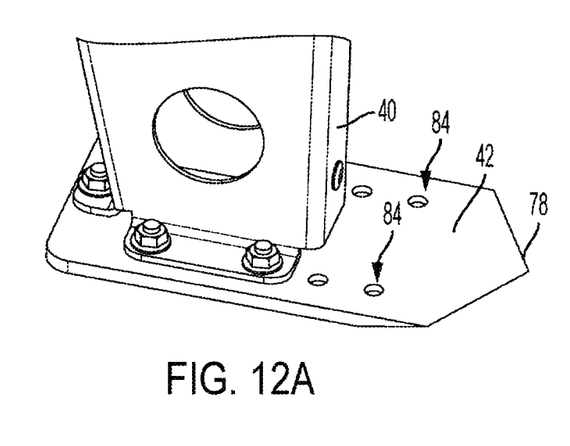
FIG. 12A is a perspective view of a portion of the stump jack of FIG. 1, illustrating a blade plate set to a radially inner position.
Figure 12B:
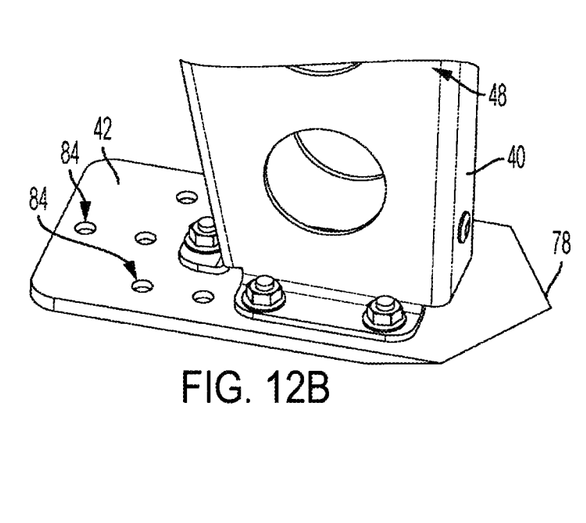
FIG. 12B is another perspective view of a portion of the stump jack of FIG. 1, illustrating the blade plate set to a radially outer position.

With reference to FIGS. 11-12B, each blade plate 42 of the cutting assembly 8 is coupled to a corresponding arm assembly 16 and includes sharpened forward edges 76*a*, 76*b* that extend to meet at a forward tip 78. When installed on a corresponding arm assembly 16, each blade plate 42 also defines a blade plate distance 100 generally defined as the radial distance between the forward tip 78 and the central axis 54.

During use, each blade plate 42 moves together with its corresponding arm assembly 16 and is configured to physically cut the material of the corresponding stump S. In the illustrated embodiment, the foot portion 40 of each lower arm 20 includes flanges 80 with first apertures 82 that correspond to second apertures 84 formed in the corresponding blade plate 42. Screws 86 extend through the first and second apertures 82, 84 and tighten to nuts 88 to couple the blade plate 42 to the foot portion 40. Each blade plate 42 includes more second apertures 84 than there are first apertures 82, thus allowing the position of the blade plate 42 to be adjusted between radially inward and radially outward positions (i.e., along a direction generally toward or away from the central axis 54). Specifically, the position of the blade plate 42 is adjusted by removing the screws 86 and re-aligning the first apertures 82 with others of the second apertures 84, and then re-inserting and tightening the screws 86. For example, FIG. 12A illustrates the blade plate 42 adjusted to a radially innermost position, while FIG. 12B illustrates the blade plate 42 adjusted to a radially outermost position. In other embodiments (not shown), other adjustable means may be utilized to secure the blade plate 42 to the foot portion 40 that do not require tools to perform adjustments (e.g., a hand-operated bayonet lock connection). In other embodiments, not shown, the individual apertures 84 may be replaced by elongated slots to allow for continuous adjustment. In still other embodiments, other forms of connection between the blade plate 42 and arm assembly 16 may be used. In still other embodiments, the blade plate 42 may be integrally formed with a portion of the arm assembly 16. Still further, while the illustrated blade plates 42 include two sets of apertures corresponding with two relative positions, it is understood that additional sets of apertures may be included to corresponding with still other positions. Still further, while the illustrated apertures adjust the radial position of the plate 42 relative to the arm assemblies 16, in alternative embodiments additional degrees of freedom—translative and rotational—may be included.

Figure 3:
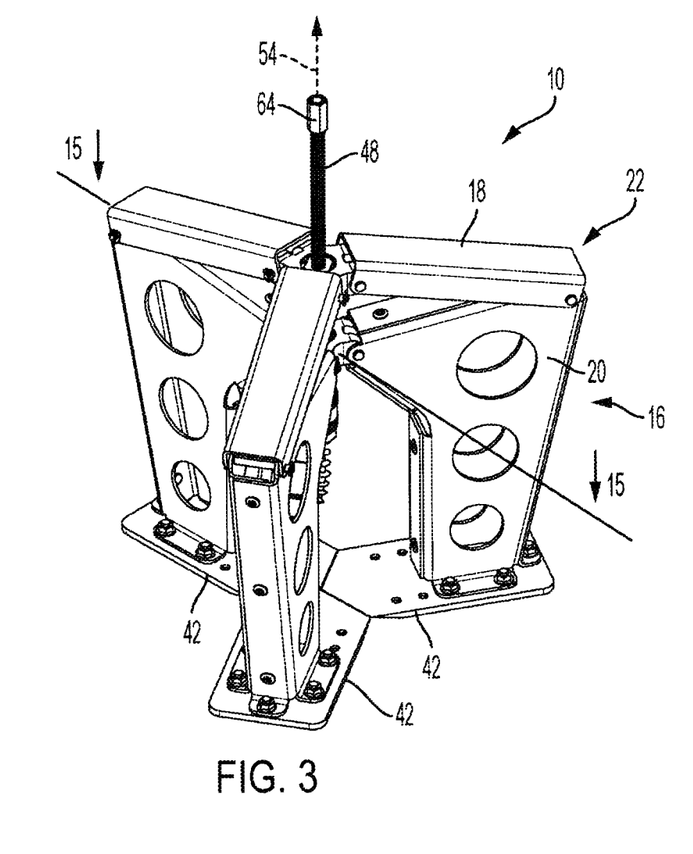
FIG. 3 is a perspective view of the stump jack of FIG. 1 set to a closed configuration.

Referring again to FIGS. 1 and 2, the jaw assembly 8 is illustrated in an open configuration with the lead screw 48 fully loosened such that the first central hub 12 is relatively distant from the second central hub 14 and located adjacent the hexagonal head 64. In the open configuration, the blade plates 42 are positioned relatively far apart from one another and from the central axis 54 (e.g., the first and second central hubs 12, 14 produce a first hub distance). FIG. 3 illustrates the stump jack 10 in a closed configuration with the lead screw 48 tightened such that the first central hub 12 is relatively close to the second central hub 14 and relatively distant from the hexagonal head 64. In the closed configuration, the blade plates 42 are converged toward one another such that the forward tips 78 generally meet at the central axis 54 (e.g., the first and second hubs 12, 14 produce a second hub distance 58*b* that is less than the first hub distance 58*a*).

To prevent the stump jack 10 from being over-tightened in the closed configuration shown in FIG. 3, which could cause the forward edges 76*a*, 76*b* to bind against one another and become dull, the stump jack 10 further includes a stop member 90 (FIG. 2) positioned on the lead screw 48. In the illustrated embodiment, the stop member 90 comprises two nuts 92 threaded to the lead screw 48 and tightened against one another. The stop member 90 is located at a position along the length of the lead screw 48 corresponding to a fully converged position of the blade plates 42 (FIG. 3). In other words, as the lead screw 48 is tightened, the stop member 90 will contact and engage the first central hub 12 when the blade plates 42 reach the fully converged position, to prevent further tightening of the lead screw 48. The position of the stop member 90 is adjustable along the length of the lead screw 48 to account for adjustment of the positions of the blade plates 42, or to generally adjust the closed configuration as desired.

Figure 13A:
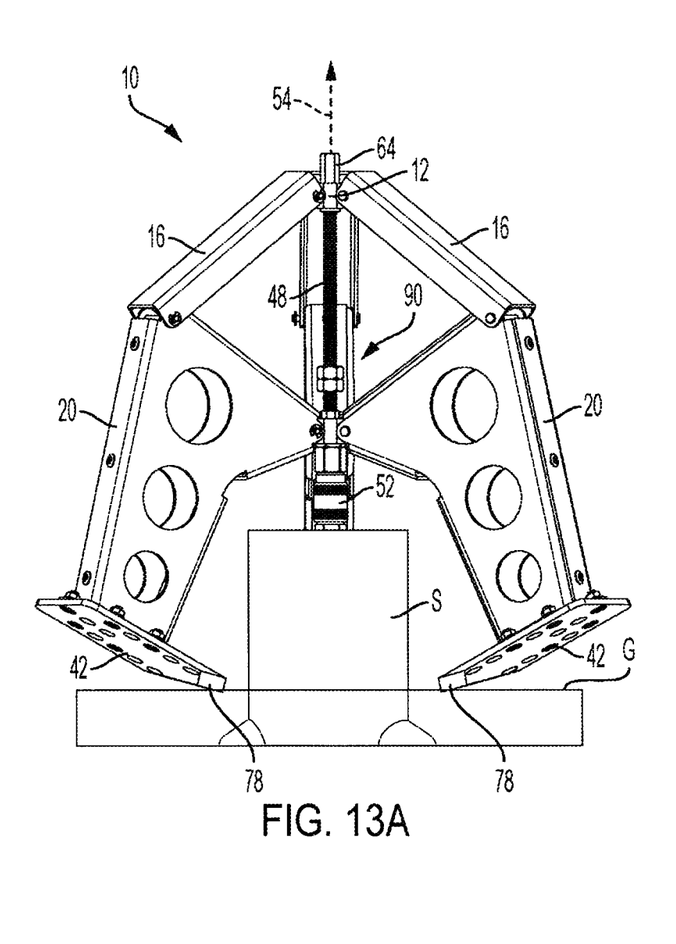
FIG. 13A is a side view of the stump jack of FIG. 1 set to the open configuration and coupled to a tree stump.
Figure 13B:
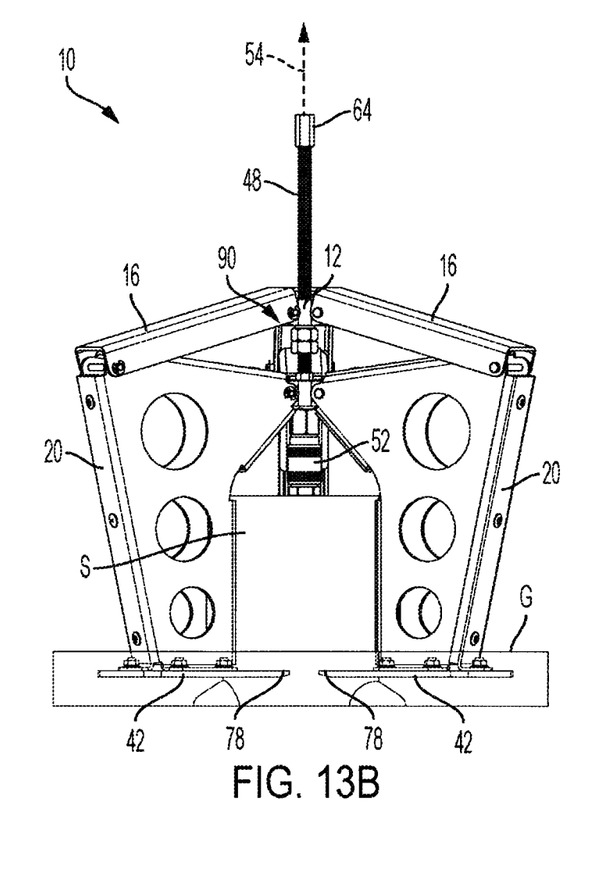
FIG. 13B is a side view of the stump jack of FIG. 1 set to the closed configuration and coupled to a tree stump.

With reference to FIGS. 13A and 13B, operation of the stump jack 10 will now be described. The jaw assembly 8 is adjusted to the open configuration as shown in FIG. 13A by rotating the lead screw 48 to separate the first central hub 12 from the second central hub 14 until a first hub distance is produced. Furthermore, the anchor 50 (FIG. 9) is detached from the lead screw 48 by actuating the quick-release coupler 52 to release the coupler portion 68.

With the parts separated, the anchor 50 is then screwed into a central region (e.g., into the cut or end surface) of the stump S that is to be removed (e.g., by engaging the hexagonal head 74 with a drill and socket to rotate the anchor 50 as discussed above). Once the anchor 50 is secured to the stump S, the cutting assembly 8 is lowered about the stump S with the blade plates 42 surrounding the stump S. The anchor 50 is then re-attached to the lead screw 48 via the quick-release coupler 52.

With the items attached, the lead screw 48 is then tightened (e.g., by engaging the hexagonal head 64 with the drill and socket and rotating the lead screw 48 in the manner described above), causing the first central hub 12 to travel axially along the lead screw 48 toward the second central hub 14. The resulting relative motion of the hubs 12, 14 cause the hub distance 58 to decrease which, in turn, causes the blade plate distance 100 to decrease and the stump jack 10 to move toward the closed configuration (FIG. 3). More specifically, as the lead screw 48 is tightened, the anchor 50 anchors the second central hub 14 relative to the stump S (e.g., exerting any external forces from the jaw assembly 8 into the stump S), and the first central hub 12 travels toward the second central hub 14. The lower arms 20 pivot relative to the second central hub 14 about the toe joint 34 (FIG. 10), causing the blade plates 42 to swing toward the stump S and converge toward the central axis 54. As the blade plates 42 swing toward the central axis 54, the blade plates 42 cut into the stump S to sever the stump S at a location below the surface of the surrounding ground G. When the forward tips 78 of the blade plates 42 reach the central axis 54, the stop member 90 engages the first central hub 12 to prevent further tightening of the lead screw 48.

With the cutting complete, the severed stump S and stump jack 10 may be removed from the ground G together as a unit with the stump jack 10 acting as a more easily accessible connection point. More specifically, the stump jack 10 may include a connection point (e.g., a ring, aperture, clip, and the like) to allow the user to hook the stump jack 10 up a winch, truck, rope, or the like to assist with removal.

With the project complete, the stump jack 10 can then be removed from the stump S by loosening the lead screw 48 (e.g., by reversing the direction of rotation of the drill and socket), causing the blade plates 42 to back out of the stump S. The anchor 50 is then detached from the quick-release coupler 52 and unscrewed from the stump S.

In some instances, a user may desire to remove a relatively hard stump (e.g., left from a hardwood tree) that requires relatively greater cutting force to sever. In such instances, the user can remove the stump in two or more sequences by setting the blade plates 42 to the radially outward position (FIG. 12A) and performing a first cut, and then adjusting the blade plates 42 to the radially inward position (FIG. 12B) and performing a second cut.

Figure 14A:
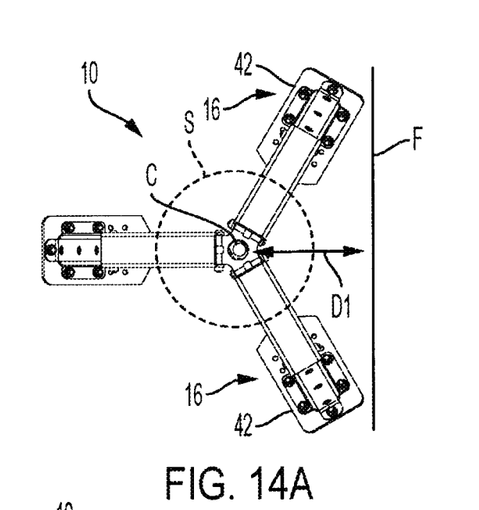
FIGS. 14A and 14B schematically illustrate the stump jack of FIG. 1 positioned adjacent various obstacles.
Figure 14B:
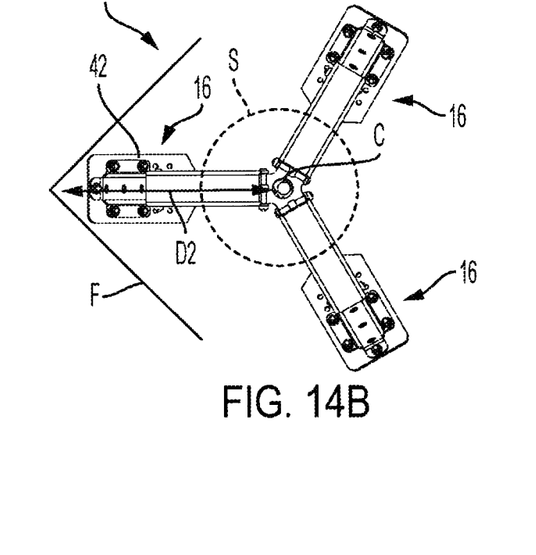

With reference to FIGS. 14A and 14B, the relatively compact geometry of the stump jack 10 allows a user to remove stumps S even when obstacles such as fences F are located close by. For example, FIG. 14A illustrates a stump S located proximate to a straight section of a fence F. By orienting the stump jack 10 with two of the arm assemblies 16 equidistant from the fence F, the stump jack 10 can remove the stump S when a center point C of the stump S is located a minimum distance D1 from the fence F. For the illustrated stump jack 10, the minimum distance D1 is approximately 8 inches. In other embodiments, the stump jack may be scaled down such that the minimum distance D1 is less than 8 inches (e.g., the minimum distance D1 may be approximately 5 inches). Similarly, FIG. 14B illustrates the stump S located proximate to a 90 degree corner of a fence F. By orienting the stump jack 10 with one of the arm assemblies 16 nearest to the corner of the fence F, the stump jack 10 can remove the stump S when the center point C of the stump S is located a minimum distance D2 from the corner of the fence F. For the illustrated stump jack 10, the minimum distance D2 is approximately 14 inches. In other embodiments, the stump jack may be scaled down for use with relatively smaller stumps, such that the minimum distance D2 may be less than 14 inches (e.g., the minimum distance D2 may be approximately 10 inches).

Figure 15:
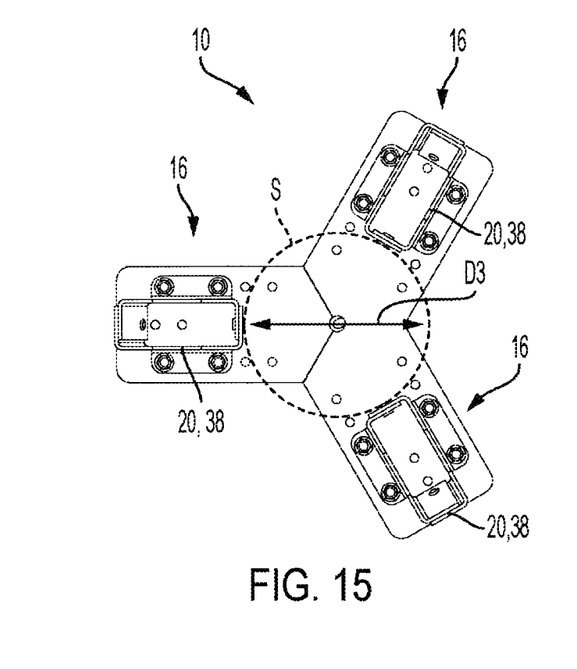
FIG. 15 is a cross-sectional view of the stump jack of FIG. 1 taken along line 15-15 of FIG. 3.

With reference to FIG. 15, when the stump jack 10 is set to the closed configuration and the blade plates 42 are located in the radially inward position (FIG. 12B), the leg portions 38 of the lower arms 20 delimit a maximum diameter D3 of a stump S that can be removed with the stump jack 10. In the illustrated embodiment, the maximum diameter D3 is approximately 7 inches. In other embodiments, the maximum diameter D3 may be greater than or less than 7 inches (e.g., D3 may be between 1 inch and 12 inches). In further embodiments, the maximum diameter D3 may be greater than 12 inches, depending on the tree type.

Figure 16:
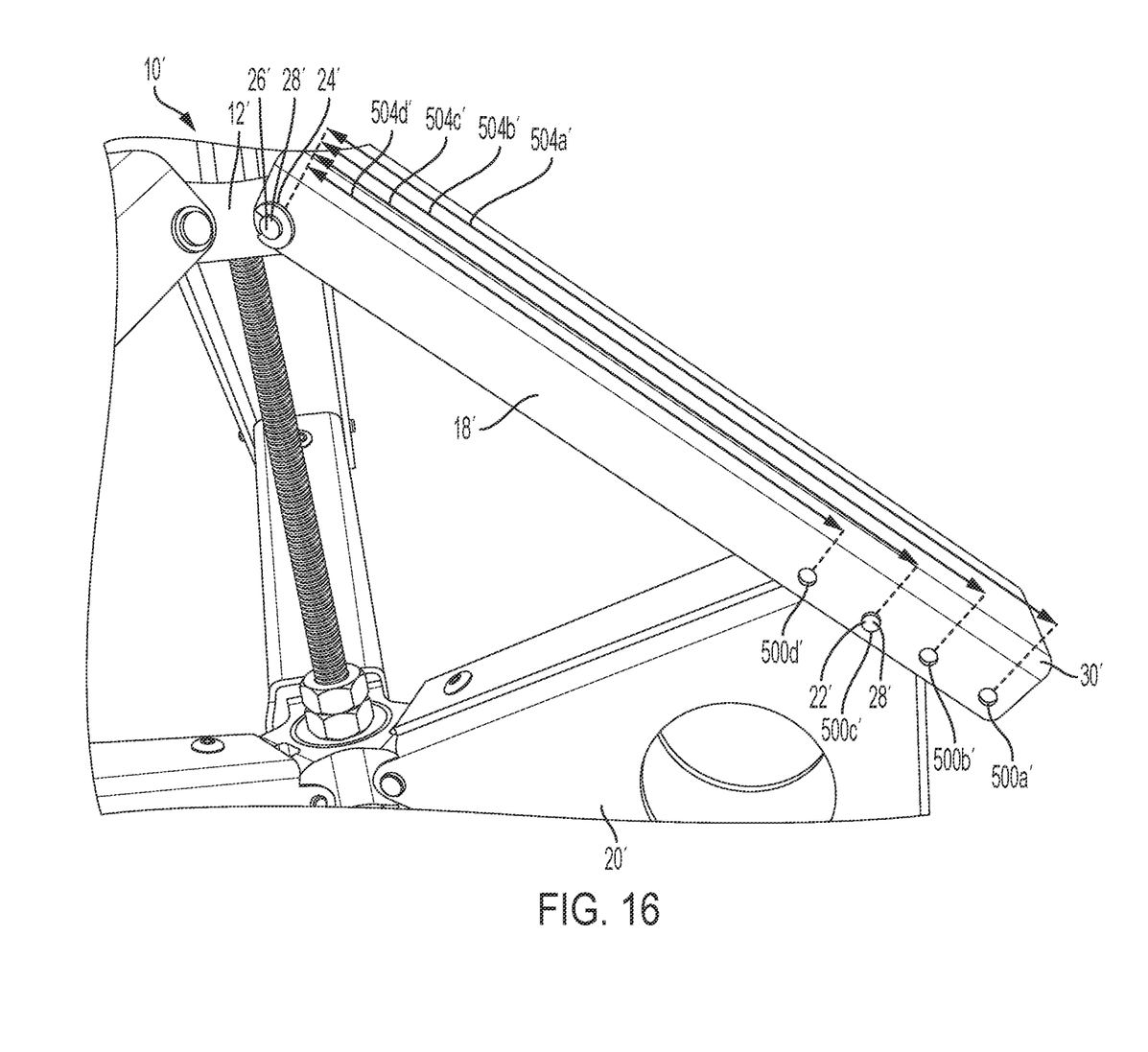
FIG. 16 illustrates another embodiment of the stump jack.

FIG. 16 illustrates another embodiment of the stump jack 10'. The stump jack 10' is substantially similar to the stump jack 10 so only the differences will be described herein. The stump jack 10' includes an elongated upper bracket or upper arm 18' with a variable effective length (e.g., the distance between the first end 24' and the mounting point 500' currently in use). The upper arm 18' includes a first end 24' hingedly connected to the first central hub 12' at an upper joint 26' (e.g., via a clevis pin 28'), and a second end 30' opposite from and spaced apart from the first end 24'.

As shown in FIG. 16, the second end 30' of the upper arm 18' includes a plurality of longitudinally spaced mounting points 500a'-d', each spaced a unique distance from the first end 24'. During use, each mounting point 500a'-d' may be selectively coupled to the lower arm 20' at the heel joint 22' (e.g., via a clevis pin 28') thereby establishing a unique effective length 504a'-d' of the upper arm 18'. In the illustrated embodiment, the user may select one of the plurality of mounting points 500a'-d' by removing and re-inserting the clevis pin 28' through the appropriate mounting point 500a'-d'.

During use, changing the mounting point 500a'-d' to which the lower arm 20' is attached (e.g., the location of the heel joint 22') alters the effective length 504a'-d' of the upper arm 18' and, therefore, allows the user to adjust the operating range and torque application of the lower arm 20' during use. More specifically, for a given operating range of hub distances 58' (e.g., from the fully open position to the closed position), the longer the effective length 504a'-d' the lesser the operating range (e.g., the difference between largest and smallest possible blade plate distance 100) of the stump jack 10' and the lesser the maximum blade plate distance 100 the stump jack 10' can produce for a given blade plate mounting location. Furthermore, the longer the effective length 504a'-d' the greater the mechanical advantage provided (e.g., the stump jack 10' applies a greater force via the blade plate 42 for a given input torque to the lead screw 42). In contrast, shortening the effective length 504a'-d' increases the operating range, increases the maximum blade plate distance 100 the stump jack 10' can produce, and decreases the mechanical advantage provided by the stump jack 10'.

For example, with the lower arm 20' attached at the first mounting point 500a', the upper arm 18' has a first effective length 504a' which produces a first operating range and first maximum plate distance. In contrast, with the lower 20' attached at the second mounting point 500b', the upper arm 18 has a second effective length 504b' that is less than the first effective length 504a'. As such, the second mounting point 500b' also produces a second operating range greater than the first operating range and a second maximum plate distance that is greater than the first maximum place distance. Furthermore, the second mounting point 500b' produces a second average mechanical advantage over the operating range that is less than the first average mechanical advantage produced over the same operating range as the first mounting point 500*a*′.

Although the disclosure has been described in detail with reference to certain preferred embodiments, variations and modifications exist within the scope and spirit of one or more independent aspects of the disclosure as described.

The invention claimed is:

1. A stump removal tool operable to sever a tree stump, the stump removal tool comprising:
   an anchor configured to be fixedly secured to the tree stump;
   a cutting assembly defining a central axis therethrough, wherein the cutting assembly is removably couplable to the anchor, and wherein the cutting assembly includes a plurality of arm assemblies each including a blade plate; and
   wherein the plurality of arm assemblies are adjustable between an open configuration in which each blade plate is located a first distance from the central axis, and a closed configuration in which each blade plate is located a second distance from the central axis less than the first distance, and
   wherein the cutting assembly further includes a lead screw co-axial with the central axis.

2. The stump removal tool of claim 1, wherein rotating the lead screw about the central axis causes the plurality of arm assemblies to adjust between the open and closed configurations.

3. The stump removal tool of claim 1, wherein the lead screw is removably couplable to the anchor.

4. The stump removal tool of claim 3, wherein the lead screw is removably couplable to the anchor so that when the lead screw is coupled to the anchor the lead screw may rotate relative to the anchor but is axially fixed relative to the anchor.

5. The stump removal tool of claim 1, wherein the anchor includes a screw portion.

6. The stump removal tool of claim 1, wherein the cutting assembly further includes a first central hub movable axially along the lead screw and a second central hub axially fixed relative to the lead screw.

7. The stump removal tool of claim 6, wherein the first central hub and the second central hub define a hub distance therebetween, and wherein changing the hub distance causes the plurality of arm assemblies to adjust between the open configuration and the closed configuration.

8. A stump removal tool operable to sever a tree stump, the stump removal tool comprising:
   a lead screw extending along a central axis of the stump removal tool and configured to be coupled to the tree stump;
   a first central hub coupled to and configured to move axially along the lead screw;
   a second central hub coupled to and axially fixed relative to the lead screw, wherein the first central hub and the second central hub define a hub distance therebetween;
   a plurality of arm assemblies pivotably coupled the first central hub and pivotably coupled to the second central hub, wherein each arm assembly including a blade plate, and wherein each blade plate defines a blade plate distance from the central axis; and
   wherein adjusting the hub distance causes at least one blade plate distance to change.

9. The stump removal tool of claim 8, wherein adjusting the hub distance causes all of the blade plate distances to change.

10. The stump removal tool of claim 8, wherein increasing the hub distance causes at least one blade plate distance to increase.

11. The stump removal tool of claim 8, further comprising an anchor removably couplable to the tree stump, and wherein the lead screw is couplable to the tree stump via the anchor.

12. The stump removal tool of claim 11, wherein the lead screw is coupled to the anchor so that the lead screw may rotate relative to the anchor but is axially fixed relatively to the anchor.

13. The stump removal tool of claim 8, wherein the first central hub is threadably coupled to the lead screw.

14. The stump removal tool of claim 8, wherein each arm assembly includes a first arm and a second arm pivotably coupled to the first arm.

15. The stump removal tool of claim 14, wherein the first arm is pivotably coupled to the first central hub and wherein the second arm is pivotably coupled to the second central hub.

16. The stump removal tool of claim 8, wherein at least one blade plate is adjustably coupled to a corresponding arm assembly.

17. A stump removal tool operable to sever a tree stump, the stump removal tool comprising:
   an anchor fixedly couplable to the stump; and
   a cutting assembly adjustable between a closed position and an open position, and wherein the cutting assembly is removably couplable to the anchor, and
   wherein the cutting assembly includes a lead screw defining an axis, and wherein the lead screw is coupled to the anchor so that the lead screw may rotate relative to the anchor but is axially fixed relatively to the anchor.

18. The stump removal tool of claim 17, wherein the cutting assembly includes one or more arm assemblies.

19. The stump removal tool of claim 1, wherein the anchor defines an anchor axis, and wherein the anchor axis is co-axial with the central axis.

20. The stump removal tool of claim 8, wherein each arm assembly produces a first mechanical advantage between the lead screw and the blade plate, and wherein the first mechanical advantage is adjustable.

* * * * *